United States Patent
Beamish

(10) Patent No.: US 6,404,863 B1
(45) Date of Patent: *Jun. 11, 2002

(54) FIRST PARTY SIGNALLING FOR CALL WAITING CALLING NUMBER IDENTIFICATION (CWCID) SYSTEM

(75) Inventor: Norman J. Beamish, Costa Mesa, CA (US)

(73) Assignee: Conexant Systems, Inc., Newport Beach, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,447

(22) Filed: Sep. 4, 1997

(51) Int. Cl.⁷ .......................... H04M 1/64; H04M 1/00; H04M 3/42; H04M 3/00
(52) U.S. Cl. .............................. 379/93.35; 379/93.23; 379/164; 379/215.01; 379/257
(58) Field of Search .......................... 379/88.01, 88.15, 379/88.21, 93.23, 93.35, 157, 164, 170, 209, 217, 215, 373, 374, 421, 386, 88.12, 100.06, 106.08

(56) References Cited

U.S. PATENT DOCUMENTS

| | | | | |
|---|---|---|---|---|
| 4,821,312 A | * | 4/1989 | Horton et al. | 379/102 |
| 4,856,055 A | * | 8/1989 | Schwartz | 379/374 |
| 5,022,071 A | * | 6/1991 | Mozer et al. | 379/93 |
| 5,263,084 A | | 11/1993 | Chaput et al. | 379/215 |
| 5,353,342 A | * | 10/1994 | Pietrowicz | 379/257 |
| 5,410,541 A | * | 4/1995 | Hotto | 370/76 |
| 5,515,431 A | * | 5/1996 | Kuhnle et al. | 379/388 |
| 5,519,774 A | * | 5/1996 | Battista et al. | 379/386 |
| 5,646,940 A | * | 7/1997 | Hotto | 370/496 |
| 5,812,649 A | * | 9/1998 | Shen | 379/142 |
| 5,825,867 A | * | 10/1998 | Epler et al. | 379/215 |
| 5,836,009 A | * | 11/1998 | Diamond et al. | 379/93.23 |
| 5,841,853 A | * | 11/1998 | Yamanishi et al. | 379/215 |

FOREIGN PATENT DOCUMENTS

| | | | | |
|---|---|---|---|---|
| EP | 0 768 785 A2 | 4/1997 | | H04M/1/57 |
| WO | WO 96/25816 | 8/1996 | | H04M/1/57 |
| WO | WO 97/11551 | 3/1997 | | H04M/9/02 |
| WO | WO 97/44959 | 11/1997 | | H04N/11/00 |

* cited by examiner

*Primary Examiner*—Krista Zele
*Assistant Examiner*—Allan Hoosain
(74) *Attorney, Agent, or Firm*—Akin, Gump, Strauss, Hauer & Feld, L.L.P.

(57) ABSTRACT

The invention is a method of receiving digital data from a Local Switching Office (LSO) on first party equipment that is communicating, in an off-hook state, via the LSO with second party equipment. The method presumes that the first party equipment has a telephone line interface that interfaces with a telephone line and an acoustic transducer interface with a loudspeaker and a microphone. The method generally includes the steps of receiving an alert signal from the LSO, temporarily preventing a first party signal from being transmitted to the line interface after receiving the alert signal, sending an acknowledgment signal to the LSO via the line interface, transmitting a pre-determined comfort signal to the loudspeaker via the acoustic transducer interface while receiving the digital data via the telephone line interface to inform the user that the digital data is being received while relieving the user from having to hear the actual reception of the digital data, or from listening to a silent loudspeaker, and finally, after receiving the digital data via the telephone line interface, restoring the first party signal through the line interface, and no longer transmitting the predetermined comfort signal to the loudspeaker. The digital data may contain, for example, caller ID information as transmitted to a Type 2 telephone capable of receiving such information.

11 Claims, 3 Drawing Sheets

FIRST PARTY SIGNALLING FOR CALL WAITING CALLING NUMBER IDENTIFICATION (CWCID) SYSTEM

BACKGROUND OF THE INVENTION

1. Field of the Invention

The present application relates generally to Customer Premises Equipment (CPE) such as telephones and, more particularly, to an improved method and apparatus for receiving digital data from a Local Switching Office (LSO) while the CPE is communicating with another CPE in an off-hook state.

2. Description of Related Art

The telecommunications industry has developed and implemented a number of innovations related to enhancing the functionality of Customer Premises Equipment (CPE). The industry has, for example, implemented a system known generally as Call Waiting wherein a first party, while communicating off-hook with a second party, may be informed that a third party wishes to communicate with the first party. In general, the Call Waiting feature is implemented by having the LSO send an audible call waiting tone to the first party CPE. The user of the first party CPE, after hearing the call waiting tone, may switch back and forth between the second and third party by "flashing" his CPE.

The telecommunications industry has also developed a system known generally as Caller Identification (CID) wherein the LSO transmits digital data to the first party CPE which then displays information regarding the identity of the calling party based on the digital data. The LSO generally transmits the digital data to the CPE using FSK modulation.

A "Type 2" CID system operates only while the first party CPE is on-hook. The Type 1 CID system, in other words, operates only when the first party CPE is not transmitting any first party signals to the LSO that would interfere with the LSO's transmission of the digital data. The Type 1 CID system also assumes that the first party is not listening to the CPE and will not hear the digital data transmitted by the LSO.

A "Type 2" CID system, however, permits off-hook signaling. Accordingly, the LSO may send the digital data corresponding to a third party while the first party CPE is communicating off-hook, via the LSO, with a second party. The general operation of a conventional Type 2 CID system is described in U.S. Pat. No. 5,263,084 entitled "Spontaneous Caller Identification With Call-Waiting" by inventors Guy J. Chaput, et al., issued Nov. 16, 1993, and assigned to Northern Telecom Limited (hereafter the '084 patent). As described in the '084 patent, Type 2 CID generally requires that the LSO transmit a special call waiting tone called a CPE Alerting Signal (CAS). The CAS is a dual-tone signal that is nominally 80 milliseconds in duration. The CAS informs the first party CPE that a third party call is available and that the LSO is prepared to transmit digital data regarding the third party. If the first party CPE is a Type 2 CPE that is capable of off-hook signaling, it responds to the CAS with an acknowledgment signal (ACK). The ACK signal informs the LSO that the first party CPE is capable of receiving the digital data. This CAS-ACK "handshake" prevents the LSO from transmitting the digital data to a CPE which is not capable of receiving and acting upon the digital data and thereby relieves the user from having to hear the generally annoying, modem-like noises of the digital data.

The CPE of the '084 patent mutes its handset 14 via switches 17, 18 after detecting the CAS and then receives the CID data from the LSO. This approach suffers from certain disadvantages. In particular, a CPE made according to the '084 patent completely mutes the acoustic transducers by disconnecting them with switches 17, 18. Muting the loudspeaker, however, unnecessarily imposes a potentially uncomfortable silence on the user while the first party CPE is receiving the digital data. If the first party CPE is sending a locally stored signal/message to the loudspeaker at the time of the CAS being received then muting the loudspeaker will unnecessarily interfere with this operation. In addition, by disconnecting and thereby completely disabling the microphone, a CPE made according to the '084 patent cannot perform any ongoing functions on the input signal from the microphone. Examples of such functions include the update of acoustic echo cancellers or local voice recording.

Accordingly, there is a need for a method and apparatus for a first party CPE to receive digital data from the LSO while communicating in an off-hook state with a second party that does not impose an uncomfortable silence on the first party listener and does not preclude functionality such as recording first party voice signals while receiving the digital data from the LSO.

SUMMARY OF THE INVENTION

The present invention relates to a method of receiving digital data from a Local Switching Office (LSO) on first party equipment that is communicating, in an off-hook state, via the LSO, with second party equipment, the first party equipment having a line interface for receiving signals from and transmitting signals to a telephone line connected to the LSO and an acoustic interface for receiving signals from a microphone and for transmitting signals to a loudspeaker. In a preferred embodiment, the method comprises the steps of the first party equipment receiving an alert signal from the LSO via the line interface while communicating, in an off-hook state, with the second party equipment, the alert signal indicating that the LSO is prepared to send the digital data; the first party equipment temporarily preventing a first party signal from being transmitted to the line interface after the alert signal has been received; the first party equipment sending an acknowledgment signal to the LSO in response to the alert signal via the line interface indicating that the first party equipment is capable of receiving the digital data; the first party equipment transmitting a predetermined local signal to the loudspeaker via the acoustic interface while receiving the digital data via the line interface to relieve the first party from having to hear the actual reception of the digital data or from having to listen to a silent loudspeaker; the first party equipment, after receiving the digital data via the line interface, restoring the first party signal to the line interface and no longer transmitting the predetermined local signal to the loudspeaker via the acoustic interface; and the first party equipment performing a function based on the digital data.

In a preferred embodiment, the digital data comprises caller ID information as transmitted to a Type 2 telephone capable of receiving such information and the local signal comprises a discrete comfort signal of predetermined nature. The comfort signal may, if desired, audibly indicate that the digital data is being received. Finally, in an alternative embodiment, the local signal comprises an intermediate portion of locally recorded message which was being provided to the loudspeaker before receipt of the alert signal.

BRIEF DESCRIPTION OF THE DRAWINGS

The just summarized invention may be best understood with reference to the following drawings, of which.

BRIEF DESCRIPTION OF THE PREFERRED EMBODIMENT

Figure 1:
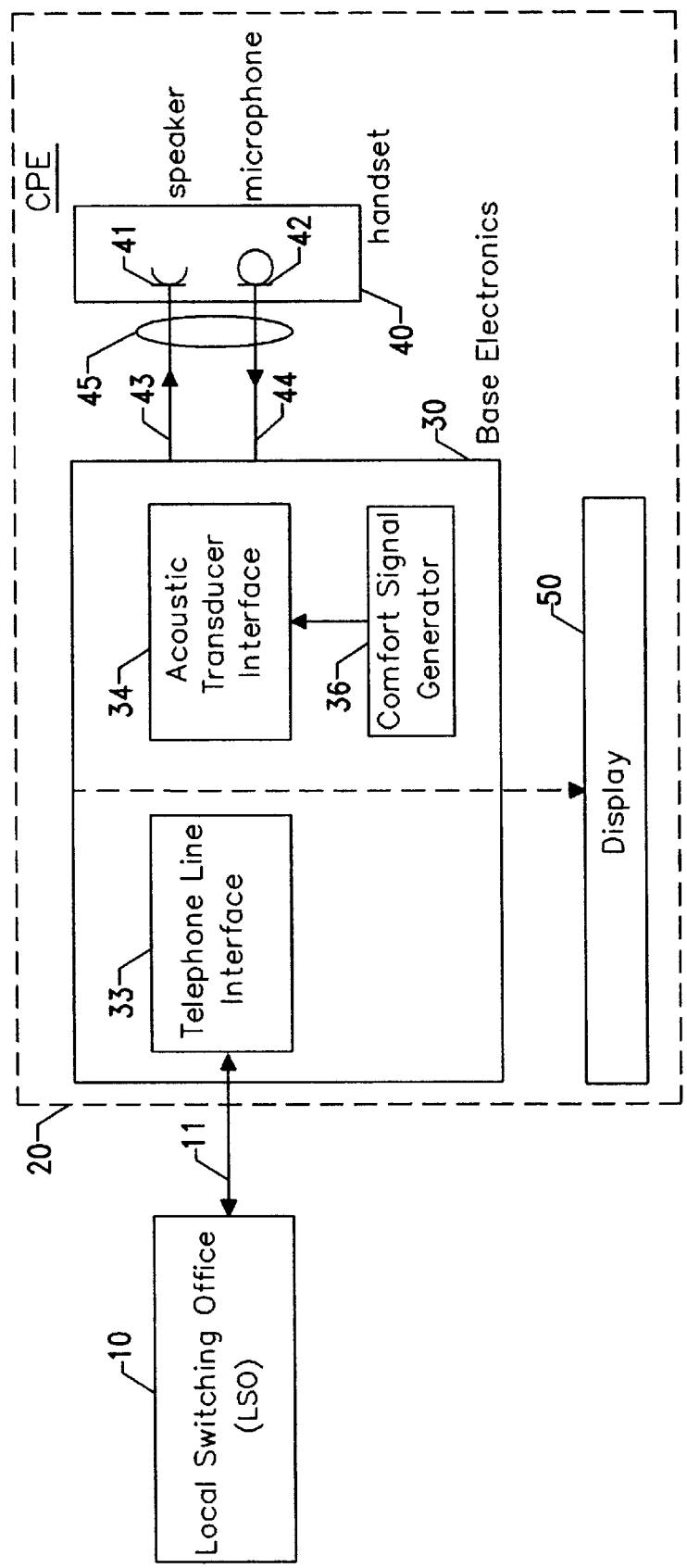
FIG. 1 is a block diagram of a first party CPE according to the present invention, emphasizing its telephone line interface which connects the CPE to the LSO via a telephone line and an acoustic transducer interface which connects the CPE to acoustic sound transducers such as a loudspeaker and a microphone via a voice path.

In a preferred embodiment, the method and apparatus of the present invention relates generally to the CPE 20 of FIG. 1. As shown, the CPE 20 generally comprises base electronics 30, an acoustic portion 40 and a display 50. The acoustic portion 40 may be a standard handset of a conventional telephone, but may also comprise a hands-free speaker box, an operator-like head set, or any other such device. The acoustic portion 40 is shown as comprising a pair of sound transducers including an output transducer 41 such as a loudspeaker and an input transducer 42 such as a microphone. The loudspeaker 41 and microphone 42 are shown as collectively residing in the acoustic portion 40 but they could under certain circumstances be physically separate from one another. The CPE, for example, may be implemented in a personal computer having a separate microphone and a separate loudspeaker.

The detailed operation of the CPE 20 is generally well known in the art and not necessary for an understanding of the present invention. Accordingly, such details have been omitted from this description for purposes of brevity. Of importance to the present invention, however, the base electronics 30 of the CPE 20 generally comprise a telephone line interface 33 and an acoustic transducer interface 34.

The telephone line interface 33 connects the CPE 20 to a conventional telephone line 11 so that it may communicate with a Local Switching Office (LSO) 10. The conventional telephone line 11 comprises a twisted pair of copper wires. The telephone line 11, therefore, constitutes a combination receive and transmit path relative to the telephone line interface 33 of the CPE 20. It is for this reason, of course, that the CPE 20 should not inject a First Party Signal onto the telephone line 11 while the LSO 10 is transmitting the digital data on the telephone line 11 to the CPE 20.

The acoustic transducer interface 34 connects the CPE 20 to the sound transducers 41, 42 via a voice path 45. The voice path 45 comprises separate listening and talking paths 43, 44. The listening path 43 transmits electric signals to the loudspeaker 41. The talking path 44 receives electric signals from the microphone 42.

Figure 2:
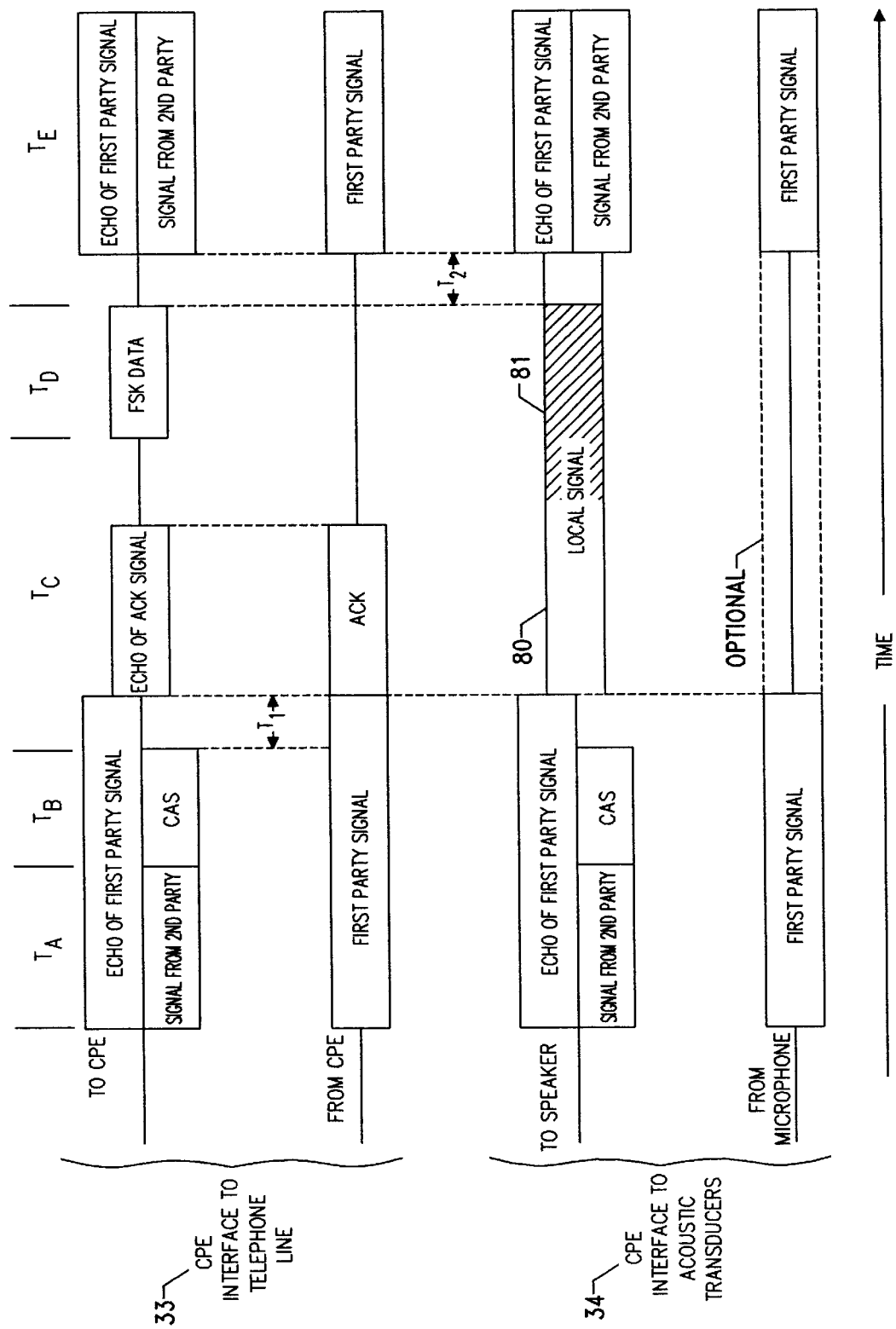
FIG. 2 is a timing diagram showing the relationship of the signals going to and coming from the CPE's telephone line interface and the acoustic transducer interface, respectively, in a first embodiment of the present invention involving a discrete comfort signal 80.

FIG. 2 is a timing diagram of the signals traveling through the telephone line interface 33 and the acoustic transducer interface 34 in accordance with the method and apparatus of the present invention. During initial time period $T_A$, the CPE 20 is communicating off-hook, via the LSO 10, with a second party. At this point, the CPE 20 is transmitting a First Party Signal to the LSO 10, while simultaneously receiving a First Party Echo and Second Party Signal from the LSO 10, via its telephone line interface 33. During this same time period $T_A$, the CPE 20 is receiving a First Party Signal from the microphone 42 via its acoustic transducer interface 34 and is transmitting electric signals corresponding to the First Party Echo and the Second Party Signal to the loudspeaker 41 via its acoustic transducer interface 34.

At some point during the communication, as shown at time period $T_B$, the LSO 10 transmits a CAS on the telephone line 11 which the CPE 20 receives via its telephone line interface 33. The CAS is a special dual-tone signal which, as shown in FIG. 2, the CPE 20 passes to the loudspeaker 41 via its acoustic transducer interface 34 and listening path 43 to alert the first party CPE 20 that the LSO 10 is prepared to send digital data to the first party CPE 10.

Next, during time period $T_c$, in accordance with a desired CAS-ACK sequence, the CPE 20 sends an acknowledgment signal (ACK) to the LSO 10 via its telephone line interface 33 and the telephone line 11. The CPE 20 sends the ACK signal after a short delay $\tau_1$ which corresponds to the time taken in detecting the LSO's transmission of the CAS signal and then responding with an ACK signal. The CPE 20 receives an echo of the ACK signal via its telephone line interface 33 due to the characteristics of the combined transmit and receive paths on the telephone line 11.

At this point, the CPE 20 does not transmit any signals coming from the LSO via the telephone line interface 33 to the loudspeaker 41 via the acoustic transducer interface 34. As further shown in FIG. 2, however, the CPE 20 does not mute the loudspeaker 41, but rather intentionally begins to transmit a locally originated signal (hereafter referred to as the Local Signal) to the loudspeaker 41 via the listening path 43. As discussed further below, the Local Signal may be a predefined comfort signal or it may be a portion of a locally stored message that was being delivered to the loudspeaker 41 prior to the CAS signal.

Subsequently, during time period $T_D$, which starts a short time after the end of the ACK signal, the LSO transmits the digital data to the CPE 20. The digital data is shown as "FSK Data" in FIG. 2, as this is the modulation generally used for CID data, but the digital data could contain other information and could be modulated in any desired manner.

During time periods $T_c$ and $T_D$. the CPE 20 does not transmit any signal on the telephone line interface 33 to the telephone line 11, other than the ACK signal, so that the CPE 20 may receive the digital data from the LSO 10, without interference, via the same telephone line 11.

Next, during time period $T_E$, and after a short delay $\tau_2$ following the end of the digital data from the LSO, the CPE 20 stops transmitting the Local Signal to the loudspeaker 41 and again begins to send the Second Party Signal to the loudspeaker 41.

Finally, the CPE 20 performs some function based on the digital data. As suggested by FIG. 1, and where the digital data is CID information, the CPE 20 may present the CID information on a display 50. The CPE 20 could, of course, perform some other function based on digital data other than CID information, the primary emphasis of the present invention being a CPE 20 that transmits a Local Signal to the CPE loudspeaker 41 while the CPE 20 is receiving digital data.

The present invention, therefore, purposely transmits a Local Signal to the loudspeaker 41, rather than merely muting the loudspeaker 41 as taught by the prior art. The Local Signal may be a comfort signal 80, or an intermediate portion 80' of a locally recorded message. In either case, transmitting a Local Signal to the CPE loudspeaker 41 does not affect the service being provided, yet it provides a number of significant advantages.

In one embodiment, therefore, the Local Signal is a predetermined comfort signal 80. The predetermined comfort signal 80 provides the user with an audible notification that digital data such as CID information is being received, and it avoids leaving the user listening to a silent line. Moreover, if the comfort signal 80 has a region 81 that substantially corresponds in time to the actual reception of the digital data, but is audibly distinct from the remainder of the comfort signal 80, the user is provided with an audible cue to differentiate between an actual CAS signal followed by digital data (e.g. CID information) and a false "talk-off event" in which the CPE 20 falsely detects a CAS signal because of speech, music or noise in the Second Party Signal or in the echo of the First Party Signal.

The predetermined comfort signal 80 is generated by a comfort signal generator 36 that can be implemented in a number of known ways. The base electronics 30 of the CPE 20 will frequently contain a microprocessor. Accordingly, the predetermined comfort signal 80 can be generated by establishing various signal parameters such as frequency and amplitude. The predetermined comfort signal 80 could be as simple as a low amplitude tone, a series of beeps, or a warble. The comfort signal 80 is preferably distinguishable from the CAS signal, but it could emulate the CAS signal, if desired.

Figure 3:
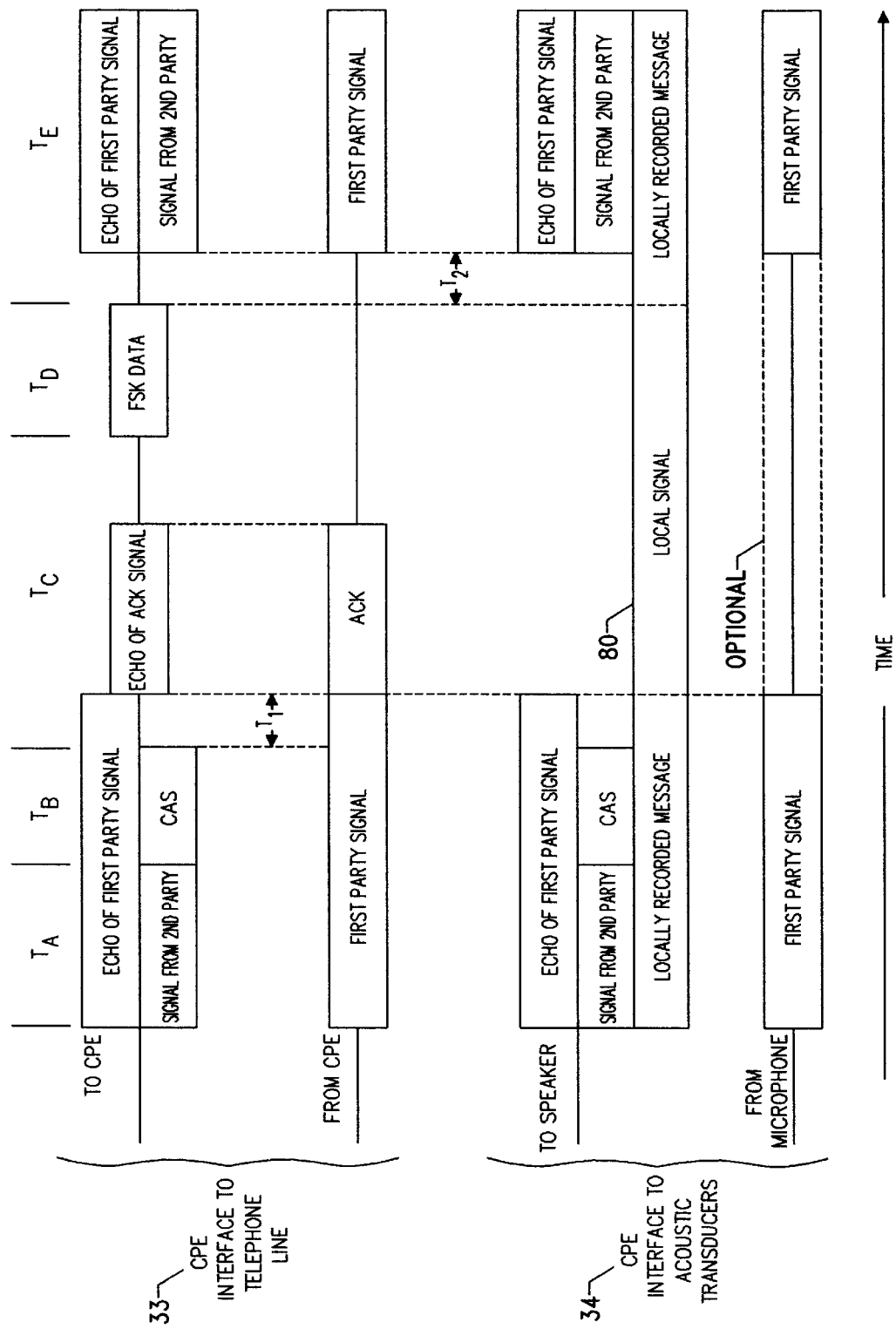
FIG. 3 is a timing diagram showing the relationship of the signals going to and coming from the CPE's telephone line interface and the acoustic transducer interface, respectively, in a second embodiment of the present invention involving an intermediate portion 80' of a locally recorded message.

In a second embodiment, the Local Signal may comprise an intermediate portion 80' of a locally recorded message rather than a discrete comfort signal 80. This embodiment is especially relevant to a CPE provided as an integrated telephone and answering machine. In such case, the first party may already be playing a locally recorded message to the CPE loudspeaker 41 while conversing with a second party. A prior art device that received a CAS signal from the LSO 10 would interrupt the playback of the locally recorded message by muting the loudspeaker. A CPE 20 according to the present invention, however, does not mute the loudspeaker 41. The CPE 20 of this invention, therefore, may temporarily prevent a signal received from the LSO 10 via the telephone line interface 33 (e.g. digital data) from being transmitted to the loudspeaker 41 while, of significance, continuing to transmit the locally recorded message to the loudspeaker 41. In such case, as best shown in FIG. 3, the Local Signal would correspond to a continuation of a locally recorded message that was already in progress before the CAS signal, and which may continue after the receipt of the digital data. The Local Signal, in other words, is an intermediate portion 80' of the locally recorded message.

The present invention also makes it possible for the CPE 20 to continue receiving First Party Signals from the microphone 42 and the talking path 44 via the acoustic transducer interface 34. This is shown in FIG. 2 by the dashed lines labeled "optional". The prior art, such as the '084 patent, specifically taught opening the talking path 44 in order to prevent the First Party Signal generated by the microphone 42 from being transmitted to the telephone line 11 by the CPE 20. As can be appreciated from reviewing FIGS. 1 and 2, however, the CPE 20 does not have to disconnect the microphone 42 from the acoustic transducer interface 34 in order to safely receive the digital data from the LSO via the telephone line interface 33. It is only important that the CPE 20 not transmit a First Party Signal from its telephone line interface 33 to the telephone line 11 while receiving digital data from the LSO. In accordance with the method and apparatus of the present invention, it is possible to continue receiving the First Party Signal from the microphone 42 in order, for example, to continue an operation which involves the recording of the local voice signal or continuing the update of algorithms which require an input from the microphone 42.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A method of receiving digital data from a Local Switching Office (LSO) on first party equipment that is communicating, in an off-hook state, via the LSO, with second party equipment, the first party equipment having a line interface for receiving signals from and transmitting signals to a telephone line connected to the LSO and an acoustic interface for receiving signals from a microphone and for transmitting signals to a loudspeaker, the method comprising the steps of:

the first party equipment receiving an alert signal from the LSO while communicating, in an off-hook state, with the second party equipment, the alert signal indicating that the LSO is prepared to send the digital data;

the first party equipment temporarily preventing a first party signal from being transmitted to the line interface after the alert signal has been received;

the first party equipment sending a signal to the LSO in response to the alert signal, the signal indicating that the first party equipment is capable of receiving the digital data;

the first party equipment initiating a transmission of a local signal to the loudspeaker while engaging in the reception of the digital data, the local signal relieving a first party from listening to the reception of the digital data or a silent loudspeaker the local signal being a completely new signal;

the first party equipment, after the reception of the digital data, restoring the first party signal to the line interface and ceasing the transmission of the local signal to the loudspeaker; and the first party equipment performing a function based on the digital data.

2. The method of claim 1 wherein the local signal is a comfort signal.

3. The method of claim 2 wherein the comfort signal comprises a signal portion that informs the first party that the digital data is being received.

4. The method of claim 1 wherein the local signal comprises a locally recorded signal.

5. A method as set forth in claim 1, wherein the digital data comprises caller identification data wherein the alert signal is a call waiting alert signal, and wherein the step of performing a function comprises displaying information based on the digital data.

6. A method as set forth in claim 1, wherein the step of temporarily preventing comprises muting an acoustical path from the microphone.

7. A method as set forth in claim 1, wherein the step of temporarily preventin comprises: by receiving a first party voice signal from the microphone via the acoustic interface: and isolating the first party voice signal from the line interface.

8. A method for first party equipment that is communicating in an off-hook state, via a Local Switching Office (LSO), with second party equipment to receive caller identification data corresponding to a third party from the LSO, the first party equipment having a line interface for receiving signals from and transmitting signals to a telephone line connected to the LSO and an acoustic interface for receiving signals from a microphone and for transmitting signals to a loudspeaker, the method comprising the steps of:

the first party equipment receiving an alert signal from the LSO while communicating, in an off-hook state, with the second party equipment, the alert signal indicating that the LSO is prepared to send the caller identification data;

the first party equipment temporarily preventing a first party signal from being transmitted to the line interface after the alert signal has been received;

the first party equipment sending an acknowledgment signal to the LSO in response to the alert signal indicating that the first party equipment is capable of receiving the caller identification data;

the first party equipment initiating a transmission of a comfort signal to the loudspeaker while engaging in a reception of the caller identification data, the comfort signal informing a first party that the caller identification data is being received and relieving the first party from hearing the reception of the caller identification data the comfort signal being a new signal with respect to the caller identification data;

the first party equipment, after the reception of the caller identification data, restoring the first party signal to the line interface and ceasing transmitting the comfort signal to the loudspeaker; and the first party equipment displaying information based on the caller identification data.

9. A method as set forth in claim 8, wherein the step of temporarily preventing comprises muting an acoustical path from the microphone.

10. A method as set forth in claim 8, wherein the step of temporarily preventing comprises:

receiving a first party voice signal from the microphone and isolating the first party voice signal from the line interface.

11. A telephone apparatus for receiving digital data from a Local Switching Office (LSO) while communicating in an off-hook state, via the LSO, with second party equipment, the apparatus comprising:

a line interface for receiving signals from and transmitting signals to a telephone line connected to the LSO;

an acoustic interface for receiving signals from a microphone and for transmitting signals to a loudspeaker;

means for receiving an alert signal from the LSO via the line interface while communicating, in an off-hook state, with the second party equipment, the alert signal indicating that the LSO is prepared to send the digital data;

means for temporarily preventing a first party signal from being transmitted to the line interface after the alert signal has been received;

means for sending an acknowledgment signal to the LSO in response to the alert signal via the line interface indicating that the first party equipment is capable of receiving the digital data;

means for transmitting a local signal to the loudspeaker via the acoustic interface while receiving the digital data via the line interface means for restoring the first party signal to the line interface after receiving the digital data via the line interface;

means for no longer transmitting the local signal to the loudspeaker via the acoustic interface; and means for performing a function based on the digital data.

* * * * *